United States Patent
Drake et al.

(10) Patent No.: US 10,986,396 B2
(45) Date of Patent: Apr. 20, 2021

(54) ADJUSTING MEDIA AVAILABILITY VIA A CONTENT CONSUMPTION ACTIVITY DASHBOARD

(71) Applicant: Disney Enterprises, Inc., Burbank, CA (US)

(72) Inventors: Edward Drake, Stevenson Ranch, CA (US); Andrew J. Wright, South Pasadena, CA (US); Bruce Bleasdale, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 578 days.

(21) Appl. No.: 14/872,748

(22) Filed: Oct. 1, 2015

(65) Prior Publication Data
US 2016/0381411 A1   Dec. 29, 2016

Related U.S. Application Data

(60) Provisional application No. 62/184,821, filed on Jun. 25, 2015.

(51) Int. Cl.
*H04N 5/445* (2011.01)
*H04N 21/431* (2011.01)
(Continued)

(52) U.S. Cl.
CPC ..... *H04N 21/4312* (2013.01); *G06F 3/04847* (2013.01); *H04N 21/251* (2013.01);
(Continued)

(58) Field of Classification Search
CPC ............. H04N 21/235; H04N 21/4331; H04N 21/4335; H04N 21/4316; H04N 21/252
(Continued)

(56) References Cited

U.S. PATENT DOCUMENTS

2008/0222546 A1    9/2008   Mudd et al.
2011/0296463 A1*  12/2011   Suslov ................ G06F 17/3053
                                                        725/44
(Continued)

OTHER PUBLICATIONS

First Office Action in Chinese Patent Application No. 2016104715553, dated Dec. 26, 2018.
(Continued)

*Primary Examiner* — Jivka A Rabovianski
(74) *Attorney, Agent, or Firm* — Patterson + Sheridan, LLP

(57) ABSTRACT

Systems and methods are described for enabling a user to bias the type of media content made available to a user account through a localized content dashboard. In one implementation, a method for adjusting media content availability associated with a user account configured to receive media content from a server system over a network, includes displaying on a content playback system a localized content dashboard, including: a summary of attributes of media content accessed by the user account, where the summary of the attributes is based on metadata associated with the accessed media content; and controls for biasing the attributes of media content delivered to the user account. The content playback system receives data corresponding to user input actuating one of the controls; and in response to receiving the data, transmits over the network to the server system data associated with the media content attribute biased by the user input.

19 Claims, 6 Drawing Sheets

(51) Int. Cl.
    *G06F 3/0484*     (2013.01)
    *H04N 21/482*     (2011.01)
    *H04N 21/258*     (2011.01)
    *H04N 21/45*     (2011.01)
    *H04N 21/25*     (2011.01)
    *H04N 21/254*     (2011.01)
    *H04N 21/4627*     (2011.01)
    *H04N 21/2387*     (2011.01)

(52) U.S. Cl.
    CPC ... *H04N 21/25891* (2013.01); *H04N 21/4532* (2013.01); *H04N 21/482* (2013.01); *H04N 21/2387* (2013.01); *H04N 21/2541* (2013.01); *H04N 21/4627* (2013.01)

(58) Field of Classification Search
    USPC .............................. 725/23, 34, 46, 61, 114
    See application file for complete search history.

(56) References Cited

U.S. PATENT DOCUMENTS

| | | | | |
|---|---|---|---|---|
| 2013/0347039 | A1* | 12/2013 | Klappert | H04N 21/4661 725/46 |
| 2015/0128162 | A1* | 5/2015 | Ionescu | G06Q 30/00 725/14 |
| 2017/0195728 | A1* | 7/2017 | Mudd | H04N 21/4532 |

OTHER PUBLICATIONS

Second Office Action in Chinese Patent Application No. 2016104715553, dated Aug. 2, 2019.

\* cited by examiner

ADJUSTING MEDIA AVAILABILITY VIA A CONTENT CONSUMPTION ACTIVITY DASHBOARD

CROSS-REFERENCE TO RELATED APPLICATIONS

This application claims the benefit of U.S. Provisional Application No. 62/184,821 filed on Jun. 25, 2015, which is incorporated herein by reference in its entirety.

TECHNICAL FIELD

The present disclosure relates to delivering media content to a device or system.

DESCRIPTION OF THE RELATED ART

Parents can review programs that were viewed by their children and browse the descriptions and parental control ratings to get an idea of content viewed by their children. However, this a laborious process that requires the parent to manually look over all of the content.

BRIEF SUMMARY OF THE DISCLOSURE

According to various embodiments, systems and methods are described for enabling a user to bias the type of media content that is made available to a user account through a localized content dashboard of a content playback user interface.

In one embodiment, a graphical user interface method for adjusting media content availability associated with a user account configured to receive media content from a server system over a network, includes: displaying on a content playback system a localized content dashboard, including: a summary of attributes of media content accessed by the user account, where the summary of the attributes is based on metadata associated with the accessed media content; and controls for biasing the attributes of media content delivered to the user account. In this embodiment, the content playback system receives data corresponding to user input actuating one of the controls; and in response to receiving the data, transmits over the network to the server system data associated with the media content attribute biased by the user input.

In various implementations, the media content may include applications, games, images, video, or other media that has metadata associated to it. In one implementation, the plurality of attributes of media content delivered to the user account includes at least two of: a content genre, a lead character type of the content, a brand or franchise associated with the content, an action type associated with the content, and an educational subject associated with the content.

In a particular implementation, the localized content dashboard displays current and desired user viewing habits associated with the user account. In a further implementation, the localized content dashboard displays content viewing trends over time by the user account.

In one implementation, the user account is associated with a minor, and the method further includes: determining if the current user using the content playback system is authorized to access the localized content dashboard prior to displaying the localized content dashboard.

In another implementation, the method further includes receiving user account personalization data from the server system in response to transmitting to the server system data associated with the media content attribute biased by the user input; and displaying on the display a personalized content user interface view for the user account based on the received personalization data.

In another embodiment, a method for adjusting media content availability associated with a user account configured to receive media content from a server system over a network, includes the server system: receiving over the network from a content playback device: account information identifying the user account; and data associated with a media content attribute biased by user input at the content playback device actuating one of a plurality of controls for biasing a plurality of attributes of the media content delivered to the user account by the server system. In this embodiment, the server system stores the received data, and based on the received data, applies personalized machine learning of the user account's media content preferences, where the personalized machine learning is used to generated a personalized media content graphical user interface for the user account at the content playback device.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

Figures 1, 2:
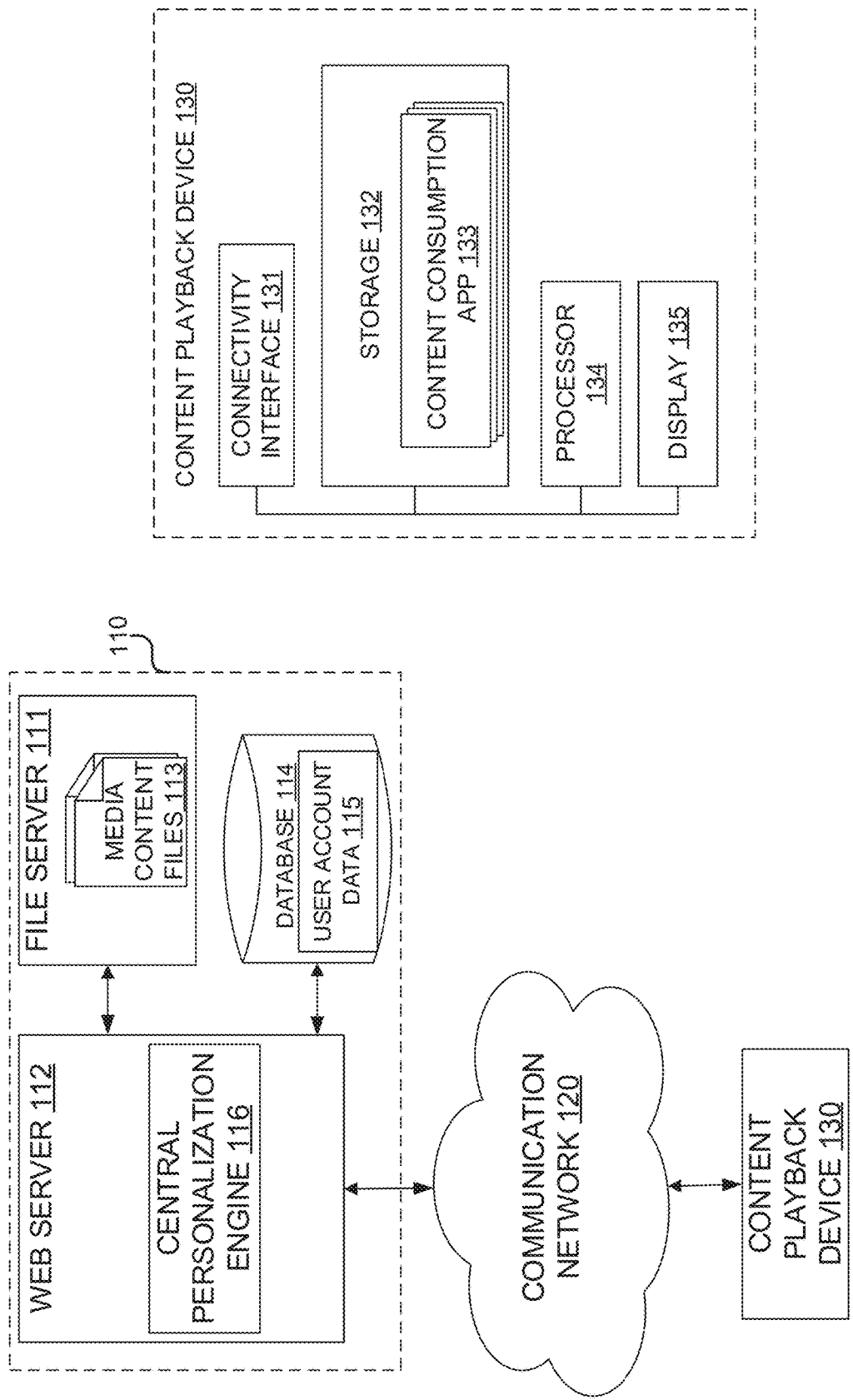
FIG. 1 is a high-level block diagram illustrating an example environment for delivery of media content in which the disclosure can be implemented.
FIG. 2 illustrates an example content playback device that may be implemented in the environment of FIG. 1.

The figures are not exhaustive and do not limit the disclosure to the precise form disclosed.

DETAILED DESCRIPTION

There is no system that exposes a content summary in the form of a visual dashboard summarizing the type of content being consumed. Nor is there a mechanism whereby users can adjust the desired content. In the parent-child example, short of simple parental control restrictions by ratings or other simple parameters, parents cannot directly influence the type of media displayed to their children via a media interface based on the content of the media.

Given the high volume of media available to consumers, technology providers are beginning to supply the means to provide highly personalized media consumption interfaces for consumers (media interfaces). Using sophisticated, high volume, event capture coupled with "big data" analysis and machine learning, user interfaces can present a highly tailored selection of media to end users. However, the engine that performs the analysis to inform the display of a given interface for a given user is centralized at a server. Within a given household, the ability of users to obtain a meaningful summary of the content of the media consumed by themselves or family members (e.g., children) is extremely limited. Additionally, a user's ability to participate in biasing the type of content displayed by the interface is equally limited.

Although conventional systems personalize media content at a centralized server based on a user's viewing habits, they fail to provide control at a local level that permits the user to influence content that is displayed to them. Besides systems that provide basic parental controls that set thresholds for content rating, such conventional systems do not accept any additional input from the user (e.g., a parent) in biasing the content delivered and displayed to the user or another user (e.g., to a child). Accordingly, even though the systems are passively "learning" the preferences of the user, the user may not be satisfied with the content that is being delivered and displayed to them. This is particularly a concern for users who wish to influence the content displayed to another user. For example, it may be undesirable for a system to deliver content to a parent's child based primarily on the child's viewing habits.

The technology disclosed herein addresses these problems. In accordance with embodiments, systems and methods are described for enabling a user to bias the type of media content that is made available to them or another user (e.g., a child) through a localized content dashboard of a content playback user interface. In implementations, the user is provided a graphical user interface with controls that allow the user to actively influence and specify the media that is made available to the user or another user (e.g., the user's child) based on the specific attributes of the media. In these implementations, the graphical user interface may display a granulized summary of the attributes of the media that has been consumed by a user over time. Accordingly, by implementing the technology disclosed herein, a user may determine if the user's content consumption goals (for the user or another person) are being met.

FIG. 1 is a high-level block diagram illustrating an example environment 100 for delivery of media content in which the invention can be implemented. As illustrated in environment 100, a server system 110 includes file server 111 that stores media content files 113 that are delivered by web server 113 to one or more playback devices 130 over communication network 120. In various embodiments, media content files 113 may include applications, games, images, video for home release of a movie, a show or series, or any other prerecorded event, and other media that has metadata associated to it.

In some embodiments, web server 112 and file server 111 may be integrated as a single server. In particular embodiments, server system 110 is part of a content delivery network (CDN). In such embodiments, the CDN may comprise a plurality of file servers 111 and a plurality of web servers 112. The plurality of file servers 111 may comprise the same media content files 113 or customized media content files depending on the regions where they deliver the media content. File servers 111 and web servers 112 may operate as a file server and web server pair (e.g., integrated as a single server or operating as two complementary servers), may operate independently, or may operate as some combination thereof.

In various implementations, the stored media content files 113 have associated metadata identifying the specific attributes of the content associated with the media files. For example, the metadata may specify: the content genre (e.g., action, education, drama, etc.), additional subcategories for the content genre (e.g., for educational genre: math, science, nature, literature, etc.), the lead character type of the content (e.g., female, male, alien, robot, etc.), the brand or franchise associated with the content, and other attributes of the content. In embodiments, the metadata associated with stored media files 113 may be stored in the media file itself or outside the media file.

In embodiments, the metadata may be temporally synched to its associated content such that a system may determine what sections of the content contain a particular attribute. Temporal metadata may provide very granular and specific descriptions of the content attributes of a given piece of media, including, for example: (i) the nature of any violence contained within the media (cartoon vs realistic), (ii) the nature of educational content that may be contained therein, and (iii) intended age range or gender of content contained therein. In this manner, a system may subsequently determine if a user viewed a section of content containing a particular attribute.

For example, consider an embodiment where the media file is a movie that includes a two-minute gun scene, but otherwise never shows guns. In this example, the temporally synched metadata may identify a "gunplay" attribute, for example, for only that two-minute segment of the movie. Accordingly, if a user watches portions of the movie, but not the gun scene, a system could subsequently determine from the temporally synched metadata that the user did not view content including gunplay. As another example, consider an embodiment where the media file is a puzzle game that tests a user's mathematical and language abilities. In this example, the metadata may identify a "mathematics" and "language" attribute for segments of the game that test these abilities.

Communication network 120 may comprise any communications network such as a cellular or data network, a satellite network, a local area network (LAN), a wide area network (WAN), a personal area network (PAN), a portion of the Internet, or any combination thereof. Communication network 120 may include any combination of physical mediums suitable for enabling communication. For example, the mediums may include a coaxial cable system, a fiber optic cable system, an Ethernet cable system, a USB system, or other similar communication medium.

Server system 110 includes a database 114 for storing user account data 115 associated with one or more user accounts registered to receive content from server system 110 (e.g., a content delivery network). The stored user account data 115 may include, for example, an identification of the primary user's name, an account name, an account password, information relating to the user's account subscription, and parental control settings for accounts configured for supervision (e.g., a child's account). Additionally, user account data 115 may include a history of the content consumed by the user account such as, for example, the time and date during which a media file 113 was consumed by the user account, the portions of media file 113 consumed by the user account, and metadata attributes associated with the media files 113 consumed by the user account. In embodiments, further described below, the stored user account data 115 additionally includes content biasing parameters specified by a user of the user account.

In exemplary environment 100, web server 112 delivers media content files 113 over communication network 120 to a content playback device 130 logged in to an authorized user account having associated user account data 115. Prior to delivery of media content files 113, a central personalization engine 116 of web server 112 may customize and filter the content delivered to content playback device 130. As would be understood by one having skill in the art, this customization and filtering of the content may inform the display of a content consumption application used by content playback device 130 to access and display content 113. In implementations, the media content 113 may be downloaded by playback device 130 prior to any media playback, streamed to playback device 130 during media playback, or downloaded and streamed by playback device 130 in any combination.

With specific reference to content playback device 130, FIG. 2 illustrates an example content playback device 130 that may be implemented in environment 100. In various embodiments, content playback device 130 may be any computing system (e.g., smart television, set top box, gaming console, laptop, smartphone, tablet, etc.) configured to provide a content consumption graphical user interface that allows a user to view or otherwise interact with content on display 135 and actively influence and specify the media content 113 that is made available to the user or another user based on the specific attributes of the media content 113.

As illustrated, device 130 includes a connectivity interface 131, storage 132 for storing a content consumption application 133 and a portion or all of media files 113, processor 134, and a display 135. Connectivity interface 131 may connect system 102 to a content distribution network (e.g., network 120) using a wireless network connection such as a local area network connection, a cellular network connection, a satellite network connection, or the like. Additionally, connectivity interface may include a physical interface for transferring and receiving information such as, for example, a USB interface.

Processor 134 executes a content consumption application 133 that is used to display a graphical user interface for a user to view media content on display 135. Additionally, the graphical user interface displays a localized (i.e., user account specific) dashboard including controls for actively influencing and specifying the media content 111 that is made available to the user or another user. In embodiments, further described below, the user's content selections within the localized dashboard are provided to central personalization engine 116 as an input for filtering and customizing the content displayed to the user. In this manner, the user may influence the content that is made available through application 133. In further embodiments, a user's localized dashboard may display a granulized summary of the attributes of the media 113 that has been consumed by a user account over time.

Figure 3:
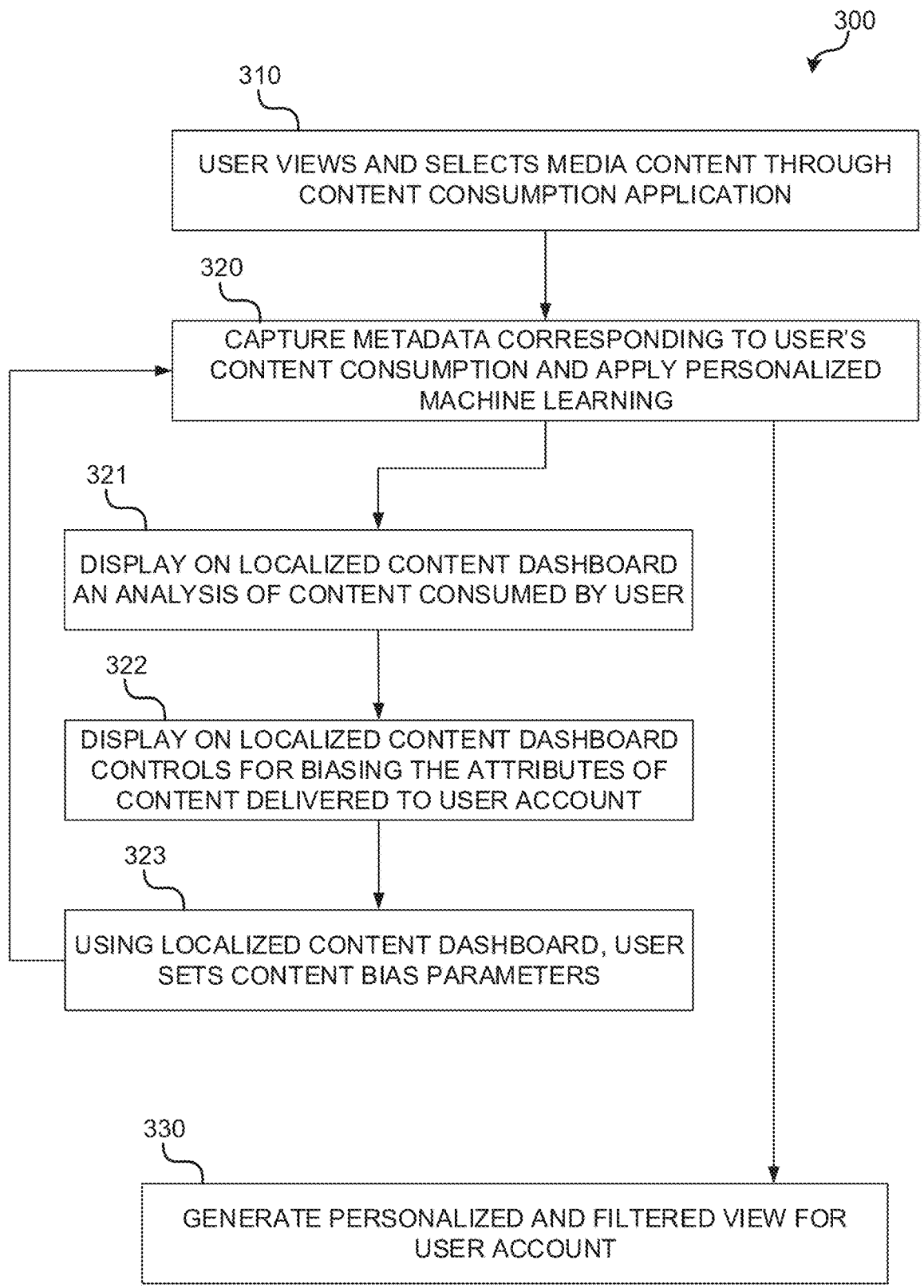
FIG. 3 illustrates a graphical user interface method for enabling a user to bias the type of media content that is made available to them or another user through a content playback user interface.

FIG. 3 illustrates a graphical user interface method 300 for enabling a user to bias the type of media content that is made available to them or another user (e.g., a child) through a content playback user interface. Although FIG. 3 will primarily be described with respect to a parent biasing the type of media that is made available to their child, it should be noted that in various embodiments, method 300 may be implemented to bias the content displayed to the user biasing the content or to any other user. It should also be noted that although FIG. 3 will primarily be described with respect to a user biasing video content made available to the user, one having skill in the art would appreciate that method 300 may be used to bias other media content (e.g., games, applications, image libraries, etc.) made available to the user through the content playback user interface.

Prior to beginning method 300, a user of a content playback device 130 may set up a user account for receiving media content 113 from a server system 110 using methods known in the art. For example, a parent may set up a child account with basic parent controls (e.g., content rating limits). During account set up, user account data 115 may be stored in database 114 of server system 110.

At operation 310 of method 300, a user of content playback device 130 views and selects media content 113 through a content playback user interface (e.g., content consumption application 133). For example, in one embodiment a child logged into a parental controlled user account may select media rated "PG" or lower though a graphical user media interface (e.g., a home screen, search results, recommend list of media, etc.).

At operation 320, metadata corresponding to the viewed media content 113 may be captured by server system 110 and stored in database 114 as user data 115 corresponding to the logged in user account. For example, server system 110 may store metadata associated with attributes of media content 113 such as, for example, content genre (e.g., action, education, drama, etc.), additional subcategories for the content genre (e.g., for educational genre: math, science, nature, literature, etc.), the lead character type of the content (e.g., female, male, alien, robot, etc.), the brand or franchise associated with the content, and other attributes of the content. Additionally, the server system 110 may store temporal metadata associated with media content 113 such as any violence contained within the media (cartoon vs realistic), educational content contained within media content 113, and the like.

Additionally, at operation 320 personalized machine learning of the user's content preferences based on the stored content metadata may be applied using central personalization engine 116 of server system 110. Based on this machine learning, at operation 330, a personalized and filtered user interface may be provided to the corresponding user account.

As noted above, in conventional systems, media is personalized at central personalization engine based solely on a user's viewing habits. This conventional approach fails to provide control at the local level that permits the user to influence the content that is displayed to them. By contrast, operations 320-323 of method 300 provide a GUI-based feedback loop that allows a user to provide localized content attribute preferences to a central personalization engine 116.

More particularly, at operation 321 a localized content dashboard including a summary and/or analysis of the metadata associated with content consumed by the user account is displayed at display 135 of content playback device 130 (e.g., using content consumption application 133). For example, the localized content dashboard may display bar charts, pie charts, line charts, histograms and/or other data summary graphics indicating what percentage of the consumed content corresponds to a particular genre (e.g., education, action, animated, etc.), a particular type of lead character (e.g., male, female, or robot), violence, or other metadata attributes.

In one embodiment, prior to displaying the localized content dashboard, application 133 determines if the current user is authorized to view the localized content dashboard. For example, in implementations where the user account is associated with a child, access to the localized content dashboard may be denied unless an authorized guardian (e.g., a parent) accesses the account using methods known in the art (e.g., by entering a password or pin). As described below, an authorized user is able to view the dashboard and change preferences for attributes of the content that should be reduced or promoted for the user account.

At operation 322, the localized content dashboard displays controls (e.g., buttons, toggles, sliders, navigational components, etc.) for biasing the attributes of the content 113 that is delivered to and displayed on the user account. In various implementations, these controls are based on metadata associated with the content 113 consumed by the user account and/or metadata associated with content 113 available for delivery from server system 110 to the user account.

Figure 4:
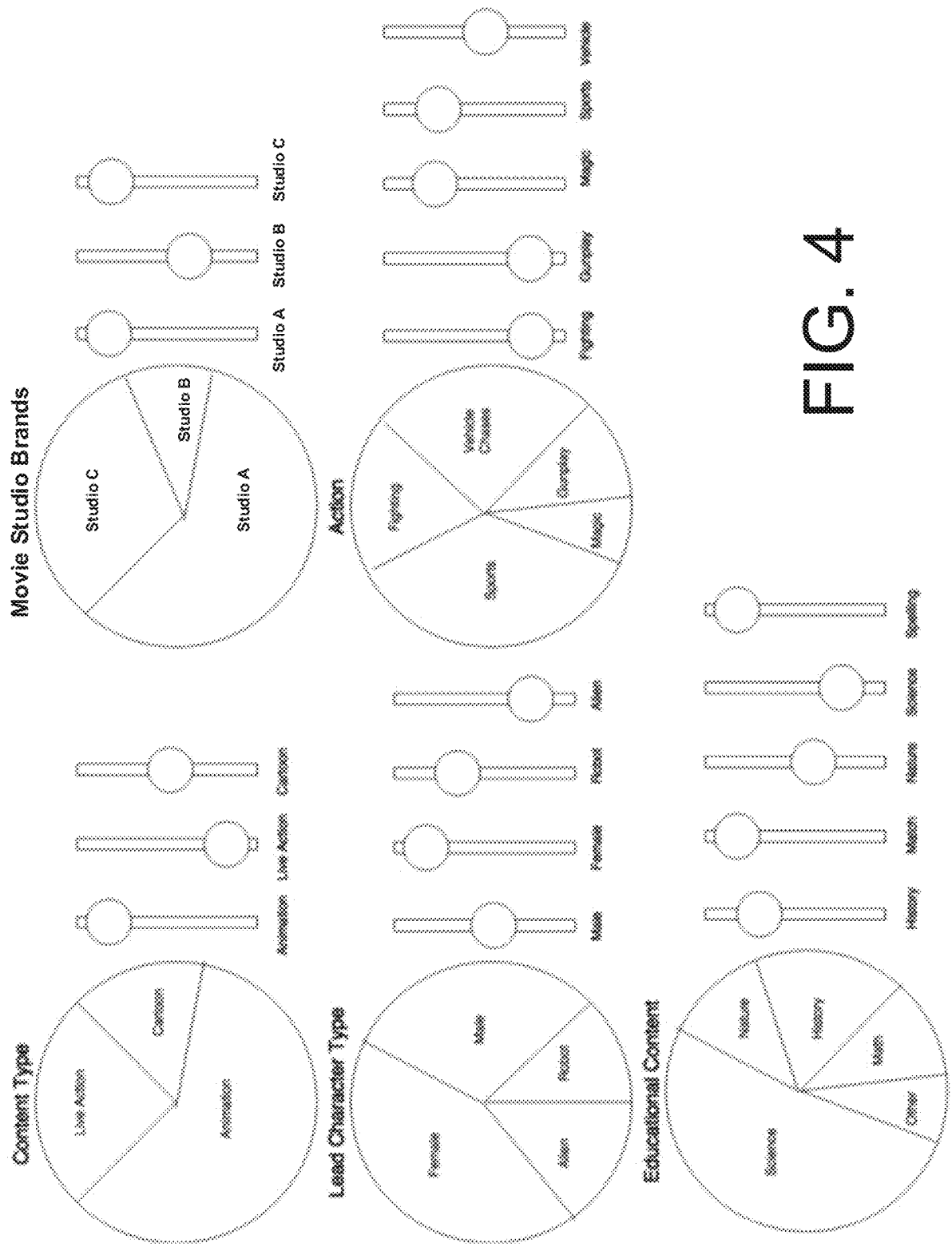
FIG. 4 illustrates an example implementation of a localized content dashboard in accordance with an embodiment of the disclosure.

Although described as separate operations 321 and 322, it should be noted that in various embodiments the displayed analysis of the consumed content and the displayed controls for biasing the attributes of the delivered content may be displayed as part of the same display of a graphical user interface. FIG. 4 illustrates one such example implementation for a localized content dashboard associated with a child's account.

As illustrated in FIG. 4, pie charts represent measured content consumption activity associated with a particular content metadata attribute (i.e., content type, lead character type, educational content, Movie Studio brands, and action) captured by the central data/analytics system. For example, under the "educational content" content attribute, about half of the consumed content is science based. The slider controls associated with each content metadata attribute (e.g., animation, live action, and cartoon sliders for the "content type" attribute) permit a parent or other guardian to promote or reduce the presence of particular content types.

As would be appreciated by one having skill in the art, exposing these content attributes to parents or other users allow them to configure or bias the type of media displayed through media interfaces (home screens, search results, recommended, etc.). For example, in some cases, a parent may wish to bias a particular franchise or theme such as princesses or heroes. As another example, a parent may want to reduce the time spent viewing content from a particular movie studio and bias it more towards another genre or movie studio. In yet another example, a parent may wish to specifically exclude a given franchise or theme because they do not think it is suitable for their children.

At operation 323, a user using the localized dashboard may set content biasing parameters by actuating the displayed controls (e.g., sliders). In various embodiments, the user may actuate the controls by applying finger swiping gestures on a touch screen interface, clicking and dragging a mouse, using a remote control, and using other user interface input methods. Using FIG. 4 as an example, a parent may actuate the illustrated sliders to: bias in favor of animated content over live action and cartoon content; bias away from action content including fighting and gunplay; bias in favor of math and spelling content over other forms of educational content; and bias in favor of content that includes a female lead character.

In various embodiments, the content biasing parameters set by the user may be stored as user account data 115 at database 114 of server system 110, stored locally at storage 132 of content playback device 130, or stored in some combination thereof. Following operation 323, at operation 320, server system 110 may use central personalization engine 116 to apply personalized machine learning to the content delivered to the user account based on the stored user-specified content bias parameters. This process may be iteratively repeated to generate a personalized and filtered view for the user account at operation 330. Accordingly, by implementing the technology disclosed herein, a user may determine if the user's content viewing goals (for the user or another person) are being met.

Figure 5:
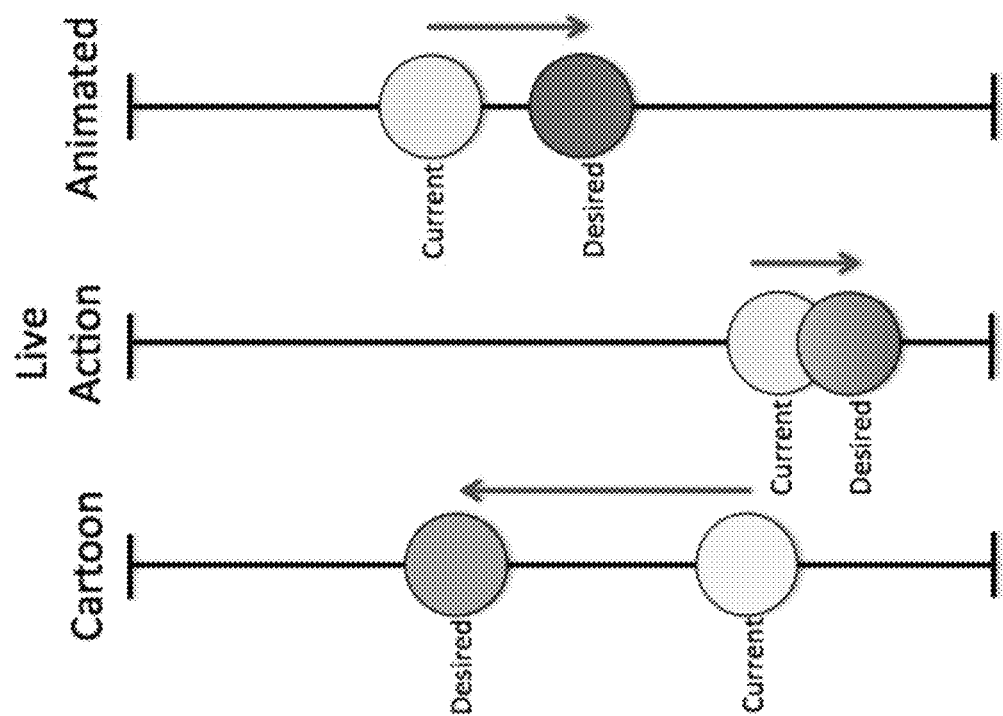
FIG. 5 illustrates an example implementation of a localized content dashboard displaying current and desired user viewing habits in accordance with an embodiment of the disclosure.
Figure 5:
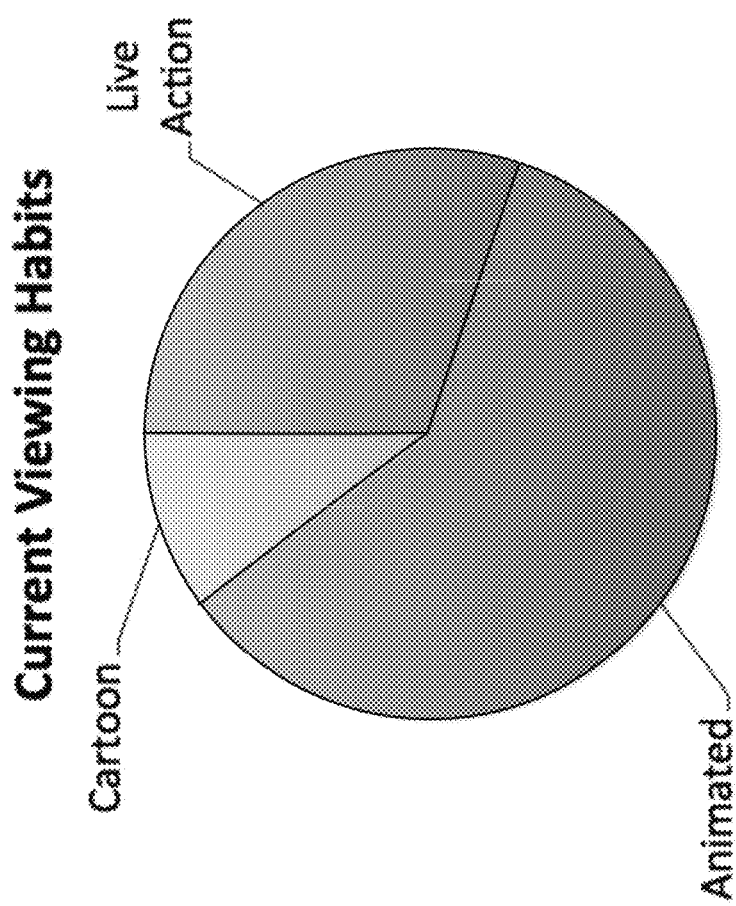

In some embodiments, the localized content dashboard may display current and desired user viewing habits, thereby allowing a user to quickly determine if the user's content viewing goals are being met. FIG. 5 illustrates one such example embodiment in implementations where a guardian wishes to bias a child's viewing habits. As illustrated, a pie chart summarizes a child's current viewing habits with respect to a content type (cartoon, live action, or animated). The displayed controls for biasing the content type include a movable slider for setting the percentage of each content type to a desired setting. Also displayed on each slider is a fixed graphic showing the current viewing habit setting.

Figure 6:
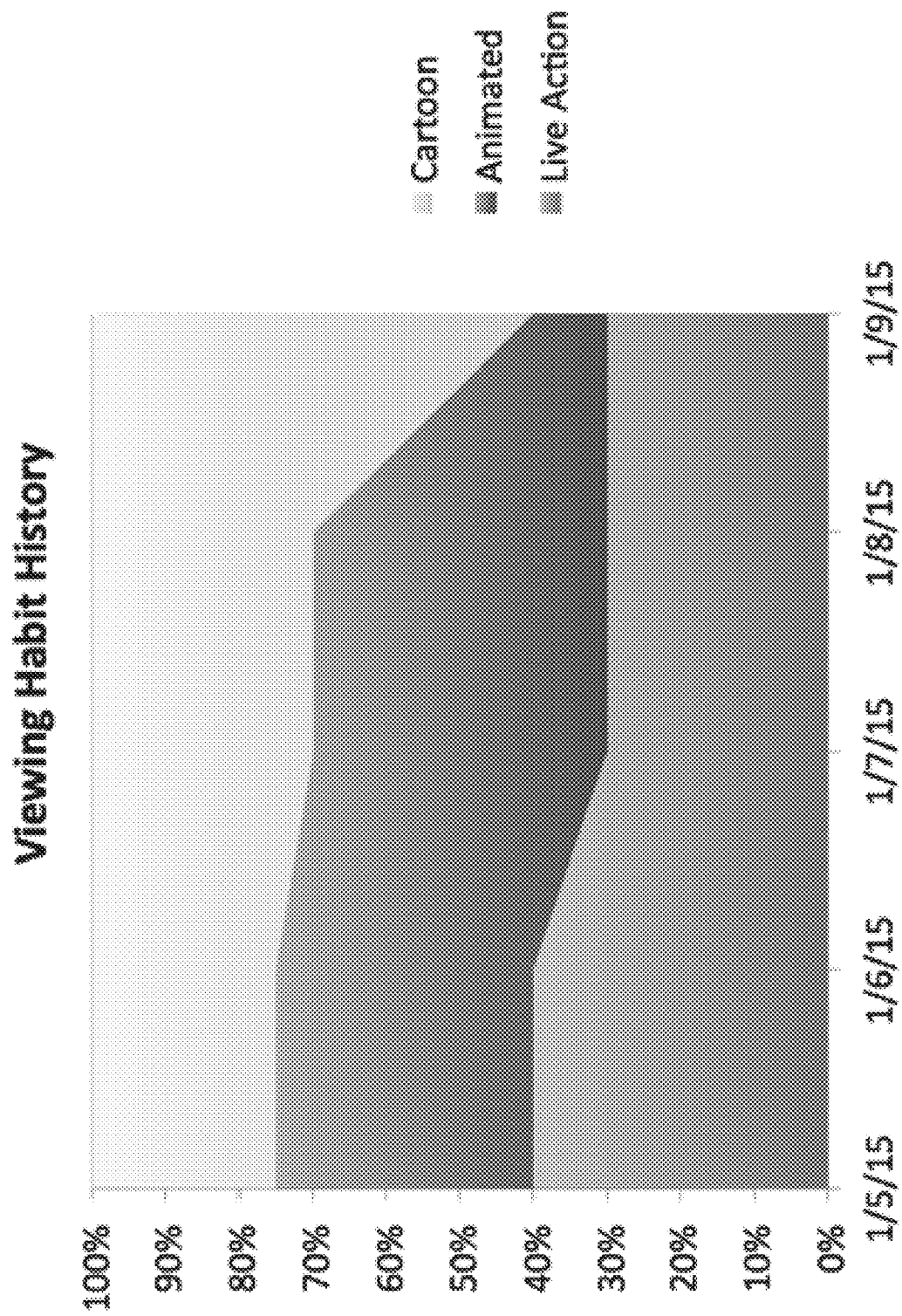
FIG. 6 illustrates an example visualization graphic that may be implemented in a localized content dashboard for displaying content viewing trends over time to show how the selection of content biasing parameters have affected a user's actual viewing behavior over time.

In some embodiments, the localized content dashboard may display content viewing trends over time to show how the selection of content biasing parameters have affected a user's actual viewing behavior over time. FIG. 6 illustrates one such example embodiment of a visualization graphic. As illustrated in this particular embodiment, the user's viewing of animated and live action content declined over a five day period. Conversely, the user's viewing of cartoon content increased over the same period.

Figure 7:
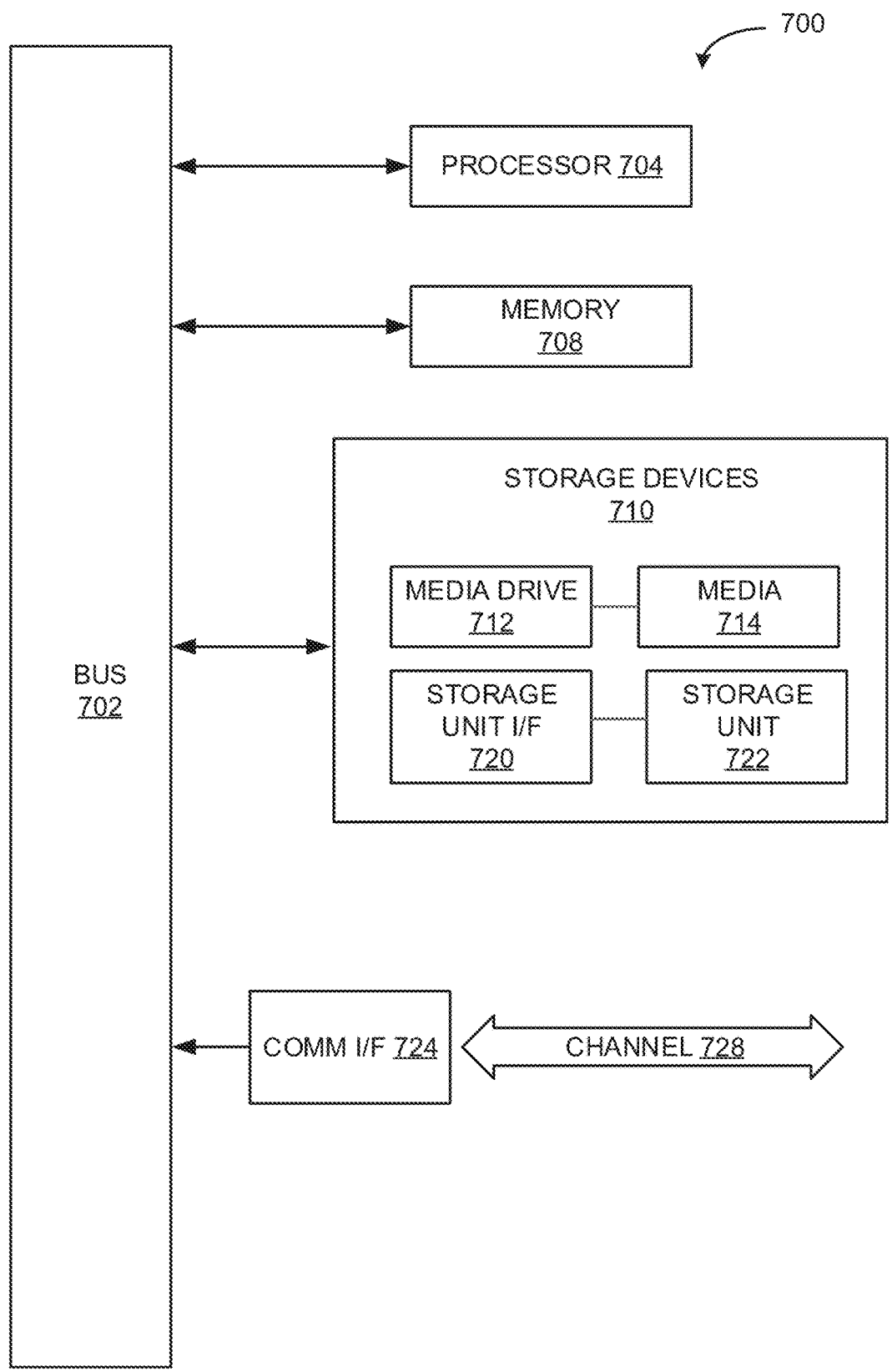
FIG. 7 illustrates an example computing module that may be used to implement various features of the system and methods disclosed herein.

FIG. 7 illustrates an example computing module that may be used to implement various features of the systems and methods disclosed herein. As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 700. After reading this description, it will become apparent to a person skilled in the relevant art how to implement the application using other computing modules or architectures.

Referring now to FIG. 7, computing module 700 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 700 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 700 might include, for example, one or more processors, controllers, control modules, or other processing devices, such as a processor 704. Processor 704 might be implemented using a general-purpose or special-purpose processing engine such as, for example, a microprocessor, controller, or other control logic. In the illustrated example, processor 704 is connected to a bus 702, although any communication medium can be used to facilitate interaction with other components of computing module 700 or to communicate externally.

Computing module 700 might also include one or more memory modules, simply referred to herein as main memory 708. For example, preferably random access memory (RAM) or other dynamic memory, might be used for storing information and instructions to be executed by processor 704. Main memory 708 might also be used for storing temporary variables or other intermediate information during execution of instructions to be executed by processor 704. Computing module 700 might likewise include a read only memory ("ROM") or other static storage device coupled to bus 702 for storing static information and instructions for processor 704.

The computing module 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical disk drive, a CD, DVD, or Blu-ray drive (R or RW), or other removable or fixed media drive might be provided. Accordingly, storage media 714 might include, for example, a hard disk, a solid state drive, magnetic tape, cartridge, optical disk, a CD, DVD, Blu-ray or other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing module 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory module) and memory slot, a PCMCIA slot and card, and other fixed or removable storage units 722 and interfaces 720 that allow software and data to be transferred from the storage unit 722 to computing module 700.

Computing module 700 might also include a communications interface 724. Communications interface 724 might be used to allow software and data to be transferred between computing module 700 and external devices. Examples of communications interface 724 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 724 might typically be carried on signals, which can be electronic, electromagnetic (which includes optical) or other signals capable of being exchanged by a given communications interface 724. These signals might be provided to communications interface 724 via a channel 728. This channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 700 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A graphical user interface method, comprising:
displaying on a display of a content playback system a graphical user interface comprising:
a graphical summary of attributes of video content previously accessed by a user account, wherein the graphical summary of the attributes of the video content is based on metadata captured from the video content previously accessed by the user account, wherein the user account accessed the video content from a server system that delivers video content to the user account over a network; and
a plurality of controls for biasing a plurality of attributes of video content delivered to the user account by the server system;
receiving data corresponding to user input at the graphical user interface actuating one of the plurality of controls;
in response to receiving the data, the content playback system transmitting over the network to the server system data associated with a video content attribute biased by the user input actuating one of the plurality of controls,
receiving user account personalization data from the server system in response to transmitting to the server system data associated with the video content attribute biased by the user input; and
using at least the received user account personalization data to display on the display a personalized video content playback graphical user interface for the user account, wherein the personalized video content playback graphical user interface displays selectable video content available for playback, wherein the displayed selectable video content depends at least in part on the video content attribute biased by the user input.

2. The graphical user interface method of claim 1, wherein the user account is associated with a minor, and wherein the method further comprises: prior to displaying the graphical user interface, determining if a current user using the content playback system is authorized to access the graphical user interface.

3. The graphical user interface method of claim 1, wherein the plurality of controls for biasing the plurality of attributes of video content delivered to the user account comprises controls for biasing at least two of the following attributes: a video content genre, a lead character type of the video content, a brand or franchise associated with the video content, an action type associated with the video content, and an educational subject associated with the video content.

4. The graphical user interface method of claim 3, wherein the graphical user interface displays current and desired user viewing habits associated with the user account.

5. The graphical user interface method of claim 3, wherein the graphical user interface displays content viewing trends over time by the user account.

6. The graphical user interface method of claim 1, wherein the plurality of controls comprises a plurality of sliders for biasing the plurality of attributes.

7. The graphical user interface method of claim 1, wherein the server system is a content delivery network.

8. The graphical user interface method of claim 7, wherein the content playback system comprises a smart television, a gaming console, a mobile device with a display, or a set top box.

9. The method of claim 1, wherein the plurality of controls are based on the metadata captured from the video content previously accessed by the user account.

10. The method of claim 1, wherein the plurality of controls comprises a control for biasing away from video content having a particular attribute.

11. The method of claim 10, wherein the plurality of controls comprises a control for biasing in favor of video content having a particular attribute.

12. A content playback system, comprising:
a display;
one or more processors; and
one or more non-transitory computer-readable mediums operatively coupled to at least one of the one or more processors and having instructions stored thereon that, when executed by at least one of the one or more processors, cause the content playback system to:
display on the display a graphical user interface comprising:
a graphical summary of attributes of video content previously accessed by a user account, wherein the graphical summary of the attributes of the video content is based on metadata captured from the previously accessed video content, wherein the user account accessed the video content from a server system that delivers video content to the user account over a network; and
a plurality of controls for biasing a plurality of attributes of video content delivered to the user account by the server system;
receive data corresponding to user input at the graphical user interface actuating one of the plurality of controls;
in response to receiving the data, transmitting over the network to the server system data associated with a video content attribute biased by the user input actuating one of the plurality of controls;
receive user account personalization data from the server system in response to transmitting to the server system data associated with the video content attribute biased by the user input; and
using at least the received user account personalization data to display on the display a personalized video content playback graphical user interface for the user account, wherein the personalized video content playback graphical user interface displays selectable video content available for playback, wherein the displayed selectable video content depends at least in part on the video content attribute biased by the user input.

13. The content playback system of claim 12, wherein the user account is associated with a minor, and wherein the instructions when executed by at least one of the one or more processors, further cause the content playback system to: determine if a current user using the content playback system is authorized to access the graphical user interface prior to displaying the graphical user interface.

14. The content playback system of claim 12, wherein the plurality of controls for biasing the plurality of attributes of video content delivered to the user account comprises controls for biasing at least two of the following attributes: a video content genre, a lead character type of the video content, a brand or franchise associated with the video content, an action type associated with the video content, and an educational subject associated with the video content.

15. The content playback system of claim 14, wherein the graphical user interface displays current and desired user viewing habits associated with the user account.

16. The content playback system of claim 14, wherein the graphical user interface displays content viewing trends over time by the user account.

17. The content playback system of claim 12, wherein the plurality of controls comprises a plurality of sliders for biasing the plurality of attributes.

18. The content playback system of claim 12, wherein the server system is a content delivery network.

19. The content playback system of claim 18, wherein the content playback system comprises a smart television, a gaming console, a mobile device with a display, or a set top box.

* * * * *